(12) United States Patent
Wang et al.

(10) Patent No.: US 11,364,941 B2
(45) Date of Patent: Jun. 21, 2022

(54) BIDIRECTIONAL WINDAGE RESISTANCE BRAKE APPARATUS

(71) Applicant: CRRC QINGDAO SIFANG ROLLING STOCK RESEARCH INSTITUTE CO., LTD., Qingdao (CN)

(72) Inventors: Yunpeng Wang, Qingdao (CN); Fei Ma, Qingdao (CN); Chonghong Yin, Qingdao (CN); Jinsong Tang, Qingdao (CN)

(73) Assignee: CRRC QINGDAO SIFANG ROLLING STOCK RESEARCH INSTITUTE CO., LTD., Qingdao (CN)

( * ) Notice: Subject to any disclaimer, the term of this patent is extended or adjusted under 35 U.S.C. 154(b) by 0 days.

(21) Appl. No.: 17/578,260

(22) Filed: Jan. 18, 2022

(65) Prior Publication Data
US 2022/0135091 A1   May 5, 2022

Related U.S. Application Data

(63) Continuation of application No. PCT/CN2020/097076, filed on Jun. 19, 2020.

(30) Foreign Application Priority Data

Aug. 21, 2019 (CN) .......................... 201910773588.7

(51) Int. Cl.
*B61H 11/10* (2006.01)
*B60T 1/16* (2006.01)

(52) U.S. Cl.
CPC ................ *B61H 11/10* (2013.01); *B60T 1/16* (2013.01)

(58) Field of Classification Search
CPC ............ B61H 11/10; B61H 11/06; B60T 1/16
See application file for complete search history.

(56) References Cited

U.S. PATENT DOCUMENTS 5,317,880 A * 6/1994 Spears ................. B62D 35/001
188/71.6

FOREIGN PATENT DOCUMENTS

| CN | 102530016 A | 7/2012 |
| CN | 103213599 A | 7/2013 |

(Continued)

OTHER PUBLICATIONS

International Search Report of PCT/CN2020/097076.
Search Report of CN201910773588.7.

*Primary Examiner* — Melanie Torres Williams
(74) *Attorney, Agent, or Firm* — J.C. Patents

(57) ABSTRACT

A bidirectional windage resistance brake apparatus including a base, a first cylinder, a second cylinder, a first windage resistance plate and a second windage resistance plate, a tail of the first windage resistance plate is hinged with the base; the first windage resistance plate includes a first supporting rod, one end of which is hinged to a middle portion of the first windage resistance plate, and another end is connected with the first cylinder; a tail of the second windage resistance plate is hinged with the base; the second windage resistance plate includes a second supporting rod, one end of which is hinged to a middle portion of the second windage resistance plate, and another end is connected with the second cylinder. The brake apparatus is high in brake efficiency and reliability.

12 Claims, 4 Drawing Sheets

(56) References Cited

FOREIGN PATENT DOCUMENTS

| | | | | |
|---|---|---|---|---|
| CN | 104590309 A | * | 5/2015 | ............ B61H 11/10 |
| CN | 106882169 A | | 6/2017 | |
| CN | 109050572 A | | 12/2018 | |
| CN | 109131421 A | * | 1/2019 | ............ B61H 11/10 |
| CN | 109131421 A | | 1/2019 | |
| CN | 109878473 A | | 6/2019 | |
| CN | 110001409 A | * | 7/2019 | |
| JP | 07277158 A | | 10/1995 | |
| JP | 2000062583 A | | 2/2000 | |
| KR | 1020070106384 A | | 11/2007 | |
| RU | 181839 U1 | | 7/2018 | |
| WO | WO2013141038 A1 | | 9/2013 | |

\* cited by examiner

BIDIRECTIONAL WINDAGE RESISTANCE BRAKE APPARATUS

CROSS-REFERENCE TO RELATED APPLICATIONS

The present application is a continuation of international application PCT/CN2020/097076 filed on Jun. 19, 2020 which claims the priority of Chinese Patent Application No. 201910773588.7 filed on Aug. 21, 2019 and entitled 'bidirectional windage resistance brake apparatus of rail train', the entire disclosures of the above identified applications are incorporated herein by reference.

TECHNICAL FIELD

The present application relates to the field of high speed train braking, in particular to a bidirectional windage resistance brake apparatus.

BACKGROUND ART

When the speed of a high speed multiple unit train is increased to more than 300 km/h, kinetic energy of the train is increased greatly in geometrical progression, and rapid brake for the train cannot be realized by adhesive braking forces. A usually used friction braking mode is easy to generate thermal fatigue cracks, so that the service lives of wheels and brake discs are shortened, and even traffic accidents of destroyed train and dead people are caused. Therefore, windage resistance braking becomes a new way of high speed train braking. Windage resistance braking is to increasing air resistance to generate braking force by using windage resistance baffles. When the train runs at a high speed, surrounding air thereof generates an acting force opposite to the moving direction of the train. At that time, the windage resistance baffle is opened from the surface of the streamline train to the outer side to bear the air resistance, thereby forming the braking force that decelerates the train directly. As air power resistance is in direct proportion to square of speed, the higher the speed is, the larger the braking force is. Therefore, the windage resistance braking mode has excellent characteristics in high speed braking.

Chinese application CN106882169A provides a bidirectional braking windage resistance plate. By parallel arranging two windage resistance plates opposite in unfolding angle, the two windage resistance plates are meshed via a rotating shaft, so that the two windage resistance plates are opened and closed simultaneously. When one windage resistance plate is opened, the other one is opened, too. The two windage resistance plates provided windage resistance braking forces simultaneously. On the one hand, the windage resistance braking force provided by the present invention is quite limited, and on the other hand, the windage resistance plates resist wind power by means of rigidity of the windage resistance plates and resistance between the windage resistance plates and gears fully. Therefore, tooth breakage of a gear mechanism is easily caused to generate potential safety hazard.

SUMMARY OF THE INVENTION

The present application provides a windage resistance brake apparatus which is high in brake efficiency and high in reliability of windage resistance plates.

A first embodiment of the present application provides a bidirectional windage resistance brake apparatus (a brake apparatus for short hereafterin), including a base, a first cylinder, a second cylinder, a first windage resistance plate and a second windage resistance plate, wherein, a tail of the first windage resistance plate is hinged with the base; the first windage resistance plate includes a first supporting rod, a first end of the first supporting rod is hinged to a substantially middle portion of the first windage resistance plate, and a second end of the first supporting rod is connected with the first cylinder;

a tail of the second windage resistance plate is hinged with the base; the second windage resistance plate includes a second supporting rod, a first end of the second supporting rod is hinged to a substantially middle portion of the second windage resistance plate, and a second end of the second supporting rod is connected with the second cylinder; and the first windage resistance plate and the second windage resistance plate can be arranged in mirror symmetry.

Optionally, the base is provided with a first slide rail and a second slide rail, the first slide rail and the second slide rail can be arranged in mirror symmetry, the first slide rail is substantially parallel to a running direction of the train, and the second slide rail is substantially parallel to the first slide rail;

the first slide rail is provided with a first slider and a second slider slidably connected with the first slide rail respectively; the first slider is hinged with a first end of a first connecting rod, and a second end of the first connecting rod is hinged with a first end of a transverse rod; the second slider is hinged with a first end of a second connecting rod, and a second end of the second connecting rod is hinged with the first end of the transverse rod;

the second slide rail is provided with a third slider and a fourth slider slidably connected with the second slide rail respectively; the third slider is hinged with a first end of a third connecting rod, and a second end of the third connecting rod is hinged with a second end of the transverse rod; the fourth slider is hinged with a first end of a fourth connecting rod, and a second end of the fourth connecting rod is hinged with the second end of the transverse rod; and The first connecting rod, the second connecting rod, the third connecting rod and the fourth connecting rod are each provided with at least one stop dog, and the stop dog is a protruding block; protruding directions of the stop dogs of the first connecting rod and the second connecting rod face the second slide rail, and protruding directions of the stop dogs of the third connecting rod and the fourth connecting rod face the first slide rail.

Optionally, the at least one stop dog of the first connecting rod and the at least one stop dog of the third connecting rod are located above the first windage resistance plate; and the at least one stop dog of the second connecting rod and the at least one stop dog of the fourth connecting rod are located above the second windage resistance plate; and the first windage resistance plate is movably contacted with the at least one stop dog of the first connecting rod and the at least one stop dog of the third connecting rod, and the second windage resistance plate is movably contacted with the at least one stop dog of the second connecting rod and the at least one stop dog of the fourth connecting rod.

Optionally, the first connecting rod, the second connecting rod, the third connecting rod and the fourth connecting rod are each provided with at least one stop dog; wherein, the at least one stop dog of the first connecting rod and the at least one stop dog of the third connecting rod are located above the first windage resistance plate, and the at least one stop dog of the second connecting rod and the at least one stop dog of the fourth connecting rod are located above the second windage resistance plate.

Optionally, a middle portion of the first slide rail is provided with a first limiting block, and a middle portion of the second slide rail is provided with a second limiting block. The first slider and the second slider are respectively located at two sides of the first limiting block, and the third slider and the fourth slider are respectively located at two sides of the second limiting block.

Optionally, the transverse rod is located between the first windage resistance plate and the second windage resistance plate.

Optionally, the first end of the transverse rod forms an integrated hinge with the first connecting rod and the second connecting rod, and the second end of the transverse rod forms an integrated hinge with the third connecting rod and the fourth connecting rod.

Optionally, the first windage resistance plate is located below the first connecting rod, the transverse rod and the third connecting rod; and the second windage resistance plate is located below the second connecting rod, the transverse rod and the fourth connecting rod.

A second embodiment of the present application provides another bidirectional windage resistance brake apparatus, including a base, a first cylinder and a second cylinder mounted on the base, a first windage resistance plate and a second windage resistance plate hinged to the base, wherein the first windage resistance plate includes a first supporting rod, a first end of the first supporting rod is hinged to the first windage resistance plate, and a second end of the first supporting rod is connected with the first cylinder, to promote an open of the first windage resistance plate;

the second windage resistance plate includes a second supporting rod, a first end of the second supporting rod is hinged to the second windage resistance plate, and a second end of the second supporting rod is connected with the second cylinder, to promote an open of the second windage resistance plate;

the base is further provided with a first slide rail and a second slide rail, which are both parallel to a running direction of the train, wherein the first slide rail is provided with a first slider and a second slider slidably connected with the first slide rail respectively; wherein the first slider is hinged with a first end of a first connecting rod, and a second end of the first connecting rod is hinged to a first end of a transverse rod; and the second slider is hinged with a first end of a second connecting rod, and a second end of the second connecting rod is hinged to the first end of the transverse rod;

the second slide rail is provided with a third slider and a fourth slider slidably connected with the second slide rail respectively; wherein the third slider is hinged with a first end of a third connecting rod, and a second end of the third connecting rod is hinged to a second end of the transverse rod; and the fourth slider is hinged with a first end of a fourth connecting rod, and a second end of the fourth connecting rod is hinged to the second end of the transverse rod;

the first connecting rod, the second connecting rod, the third connecting rod and the fourth connecting rod are each provided with at least one stop dog; wherein the stop dogs of the first connecting rod and the third connecting rod are located above the first windage resistance plate, and the stop dogs of the second connecting rod and the fourth connecting rod are located above the second windage resistance plate.

Optionally, a middle portion of the first slide rail is provided with a first limiting block, and the first slider and the second slider are respectively located at two sides of the first limiting block; and a middle portion of the second slide rail is provided with a second limiting block, and the third slider and the fourth slider are respectively located at two sides of the second limiting block.

A third embodiment of the present application provides a rail train, a roof of which is provided with the bidirectional windage resistance brake apparatus according to any one of the above-mentioned technical solutions.

Further, the first cylinder and the second cylinder of the bidirectional windage resistance brake apparatus are electrically connected with an electric system of the rail train.

The present application has the beneficial effects as below:

1. In at least one embodiment of the present application, the first windage resistance plate is driven by the first cylinder and the second windage resistance plate is driven by the second cylinder, thus the first windage resistance plate or the second windage resistance plate is started according to different traveling directions of the train, so that the using efficiency of the windage resistance plates is improved, and the problem that the two windage resistance plates are started together or closed together in conventional bidirectional windage resistance plates is solved; a condition that one of the two windage resistance plates started together provides a low windage resistance braking force is avoided, and it is realized that the bidirectional windage resistance brake apparatus starts the corresponding windage resistance plates according to the traveling directions of the train, and therefore, the brake efficiency of the whole apparatus is improved.

2. In at least one embodiment of the present application, by arranging parts such as the slide rails, the sliders and the connecting rods and the mutual connecting relationships thereof, the windage resistance plates will not be blown broken while providing the braking force.

3. In at least one embodiment of the present application, when windage resistance braking is stopped, the cylinders release pressure, the windage resistance plates return to the horizontal position under gravity to be fit with the upper side of the train body, and the sliders under the action of the connecting rods return to the initial position, so that the whole apparatus is closed automatically, solving a tedious close flow of a conventional windage resistance brake apparatus.

Figure 1:
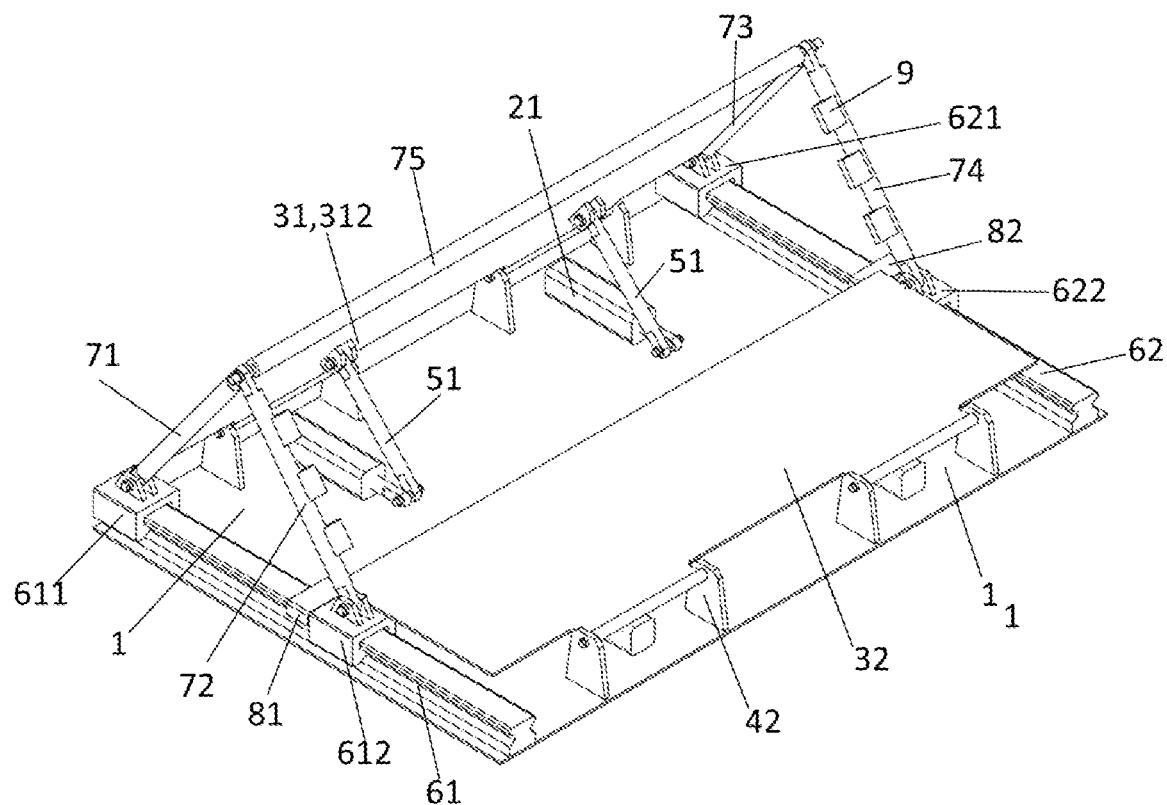
FIG. 1 is an open state diagram of a first windage resistance plate according to an embodiment.

wherein, 1 base, 21 first cylinder, 22 second cylinder, 31 first windage resistance plate, 311 tail of first windage resistance plate, 312 middle portion of first windage resistance plate, 32 second windage resistance plate, 321 tail of second windage resistance plate, 322 middle portion of second windage resistance plate, 41 first hinge seat, 42 second hinge seat, 51 first supporting rod, 52 second supporting rod, 61 first slide rail, 611 first slider, 612 second slider, 62 second slide rail, 621 third slider, 622 fourth slider, 71 first connecting rod, 72 second connecting rod, 73 third connecting rod, 74 fourth connecting rod, 75 transverse rod, 81 first limiting block, 82 second limiting block, 9 stop dog.

DETAILED DESCRIPTION OF THE EMBODIMENTS

The technical solutions of the present application will be described in detail below in combination with specific embodiments. However, it should be understood that elements, structures and features in one embodiment may also be advantageously incorporated into other embodiments without further description.

In the description of the present application, it should be noted that terms such as "first" and "second" are used for descriptive purposes only, and cannot be understood as indicating or implying the relative importance, or implicitly indicating the number of indicated technical features. Therefore, the features defined with "first" and "second" may explicitly or implicitly include one or more of these features.

In the description of the present application, it should be noted that the terms "connect", "connecting" and "connected" should be understood in a broad sense unless otherwise clearly specified and limited. For example, they might be fixed connection, detachable connection, or integrated connection; might be direct connection or indirect connection through an intermediate medium, and might be internal connection of two elements. For those of ordinary skill in the art, the specific meanings of the above-mentioned terms in the present application can be understood under specific circumstances.

The embodiments are only described as preferred embodiments of the present application, and are not intended to limit the scope of the present application. Various modifications and improvements made on the technical solutions of the present application by ordinary skill in the art without departing from the design spirit of the present application shall fall within the protective scope confirmed by the claims of the present application.

As shown in FIG. 1 to FIG. 5, the first embodiment of the present application provides a bidirectional windage resistance brake apparatus (a brake apparatus for short hereafterin) of a rail train, including a base 1, a first cylinder 21 and a second cylinder 22, and the cylinders 21 and 22 being mounted on the base 1; the brake apparatus further includes a first windage resistance plate 31 and a second windage resistance plate 32, wherein, a tail 311 of the first windage resistance plate is hinged with the base 1 via a first hinge seat 41; the first windage resistance plate 31 includes a first supporting rod 51, the first end of the first supporting rod 51 is substantially hinged to a middle portion 312 of the first windage resistance plate, and the second end thereof is connected with a telescopic rod of the first cylinder 21; the telescopic rod of the first cylinder pushes the first supporting rod to move so as to open or close the first windage resistance plate.

A tail 321 of the second windage resistance plate is hinged with the base 1 via a second hinge seat 42; the second windage resistance plate 32 includes a second supporting rod 52, the first end of the second supporting rod 52 is substantially hinged to a middle portion 322 of the second windage resistance plate, and the second end thereof is connected with a telescopic rod of the second cylinder 22; the telescopic rod of the second cylinder pushes the second supporting rod to move so as to open or close the second windage resistance plate.

The first windage resistance plate 31 and the second windage resistance plate 32 may be arranged in mirror symmetry.

The first cylinder 21 is able to drive the first windage resistance plate 31 to open or close via the first supporting rod 51, the second cylinder 22 is able to drive the second windage resistance plate 32 to open or close via the second supporting rod 52, and the first windage resistance plate 31 and the second windage resistance plate 32 can be driven respectively according to different train traveling directions. Taking FIG. 6 and FIG. 7 as an example, when wind is blown from the direction indicated by the arrow, the second cylinder 22 drives the telescopic rod to retract, the second supporting rod 52 pushes the second windage resistance plate 32 to ascend and open, as the tail 321 of the second windage resistance plate is hinged with the second hinge seat 42, the second windage resistance plate 32 performs a rotating motion by taking the second hinge seat 42 as a rotating center, and when the second cylinder 22 reaches the stroke limit, the second windage resistance plate 32 forms a certain angle with the base 1 to provide braking force for train braking. The moving principle of the first windage resistance plate is similar to that of the second windage resistance plate (as shown in FIG. 1), and will not be repeated here.

Optionally, as shown in FIG. 1 to FIG. 4, in the present application, the base 1 is further provided with a first slide rail 61 and a second slide rail 62, which are substantially arranged in parallel. Each slide rail is substantially parallel to the running direction of the train, a middle portion of the first slide rail 61 is provided with a first limiting block 81, and a middle portion of the second slide rail 62 is provided with a second limiting block 82.

Figure 3:
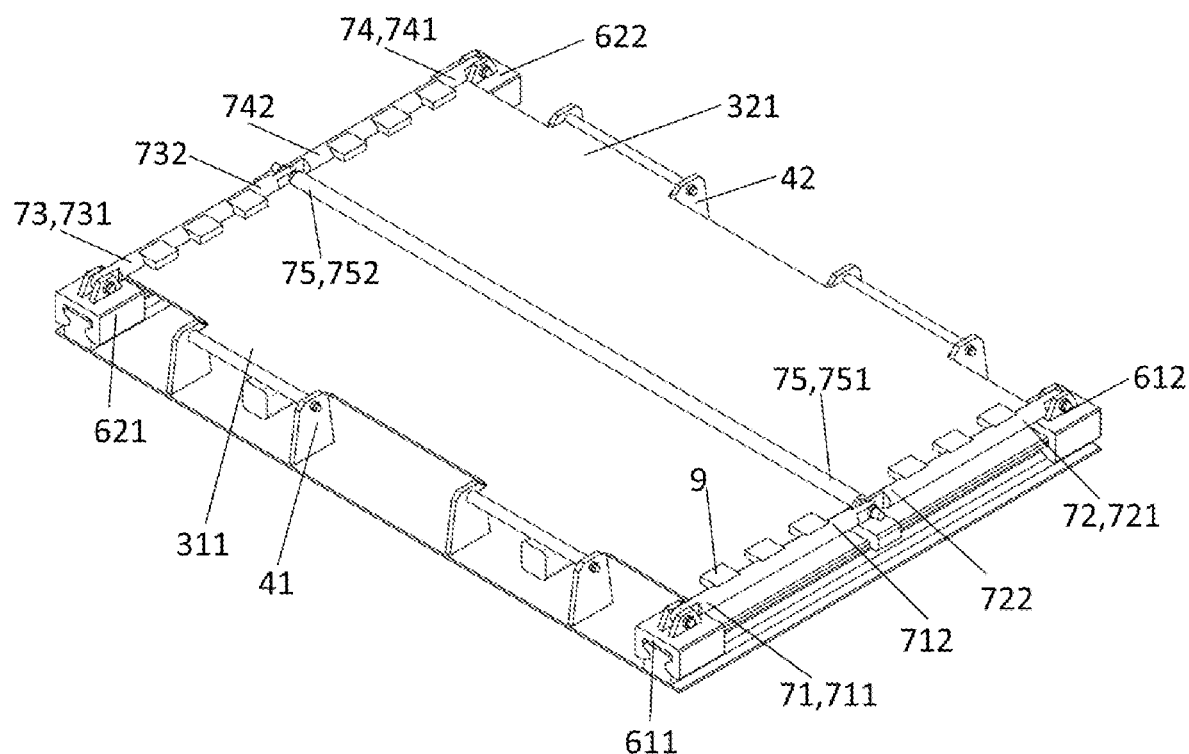
FIG. 3 is a perspective view of a windage resistance plate in a closed state.

As shown in FIG. 3, the first slide rail 61 is provided with a first slider 611 and a second slider 612. The first slider 611 is slidably connected with the first slide rail 61, the first slider 611 is hinged with the first end 711 of the first connecting rod, and the second end 712 of the first connecting rod is hinged with the first end 751 of the transverse rod. The second slider 612 is slidably connected with the first slide rail 61, the second slider 612 is hinged with the first end 721 of the second connecting rod, and the second end 722 of the second connecting rod is hinged with the first end 751 of the transverse rod; the first connecting rod 71 and the second connecting rod 72 are jointly hinged with the first end 751 of the transverse rod. The first slider 611 and the second slider 612 are respectively located at two sides of the first limiting block 81, so that the first limiting block 81 can limit excessive sliding of the sliders, thereby limiting opening of the first windage resistance plate.

The second slide rail 62 is provided with a third slider 621 and a fourth slider 622. The third slider 621 is slidably connected with the second slide rail 62, the third slider 621 is hinged with the first end 731 of the third connecting rod, and the second end 732 of the third connecting rod is hinged with the second end 751 of the transverse rod. The fourth slider 622 is slidably connected with the second slide rail 62, the fourth slider 622 is hinged with the first end 741 of the fourth connecting rod, and the second end 742 of the fourth connecting rod is hinged with the second end 752 of the transverse rod; the third connecting rod 73 and the fourth connecting rod 74 are jointly hinged with the second end 752 of the transverse rod. The third slider 621 and the fourth slider 622 are respectively located at two sides of the second limiting block 82, so that the second limiting block 82 can limit excessive sliding of the sliders, thereby limiting opening of the second windage resistance plate.

It is to be noted that the two ends of each slide rail may be respectively provided with a limiting member to limit the corresponding slider from falling to leave the slide rail, so that each slider moves between the corresponding limiting block at the middle and the limiting member at the end. When a mounting space on the train can bring corresponding convenience, a part structure of the train can serve as the limiting members to limit falling of the sliders without additionally arranging limiting members on the slide rails. In the present embodiment, the structure of the train is regarded as the limiting members, without arranging limiting members on the slide rails.

Figure 4:
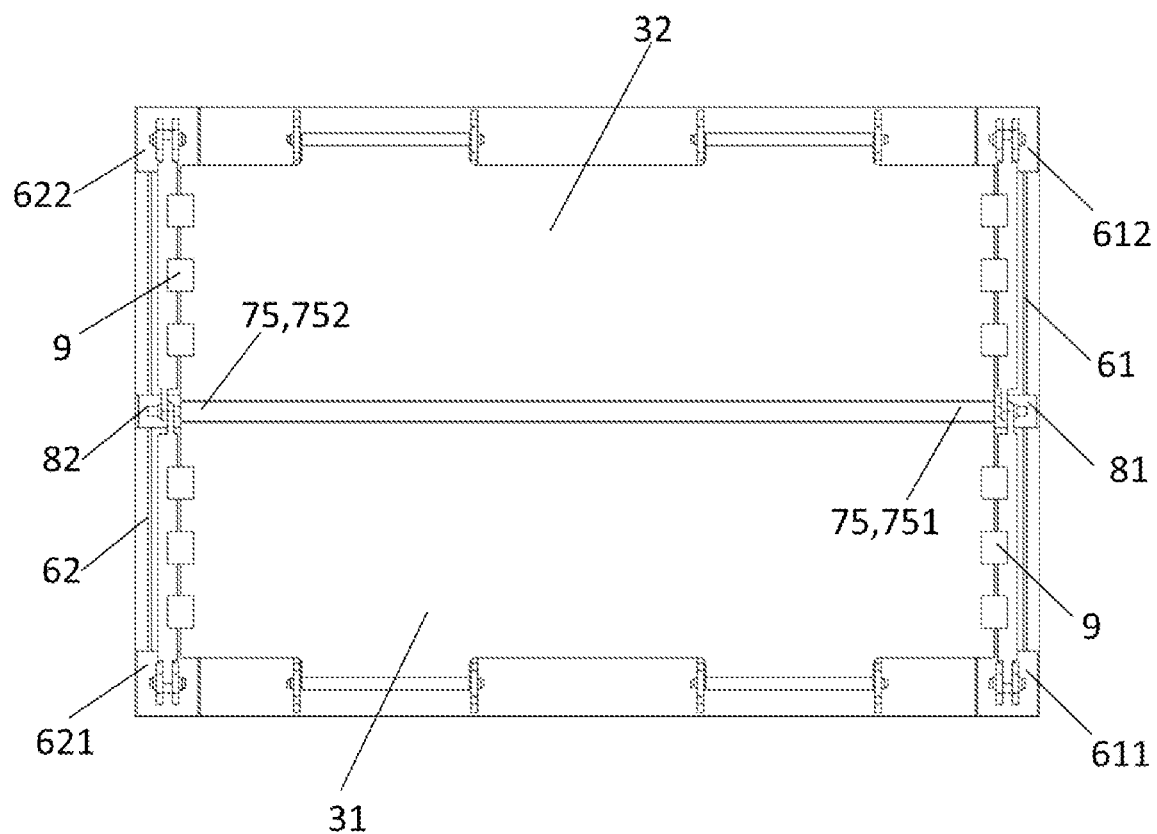
FIG. 4 is a top view of the windage resistance plate in the closed state.
Figure 5:
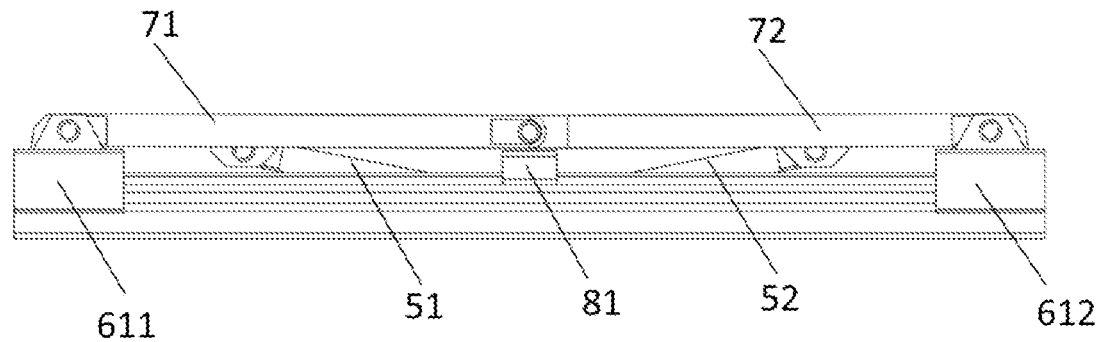
FIG. 5 is a side view of the windage resistance plate in the closed state.

The first connecting rod 71, the second connecting rod 72, the third connecting rod 73 and the fourth connecting rod 74 are each provided with at least one stop dog 9. The present embodiment shows a condition that each connecting rod is provided with three stop dogs. The stop dog 9 may be a protruding block; protruding directions of the stop dogs of the first connecting rod 71 and the second connecting rod 72 face the second slide rail 62, and protruding directions of the stop dogs of the third connecting rod 73 and the fourth connecting rod 74 face the first slide rail 61. The stop dogs 9 are located above the first windage resistance plate 31 and the second windage resistance plate 32, the stop dogs are movably contacted with the first windage resistance plate 31, and the stop dogs are movably contacted with the second windage resistance plate 32. Specifically, as shown in FIG. 3 and FIG. 4, the at least one stop dog 9 of the first connecting rod 71 and the at least one stop dog 9 of the third connecting rod 73 are located above the first windage resistance plate 31, and the at least one stop dog 9 of the second connecting rod 72 and the at least one stop dog 9 of the fourth connecting rod 74 are located above the second windage resistance plate 32, to limit excessive opening of the windage resistance plates. It is to be noted that the shape of the stop dogs are not limited to protruding blocks in the present embodiment, other structures located above the windage resistance plates to block excessive opening of the windage resistance plates also fall into the protection scope of the present application; for example, but not limited to, the stop dogs arranged as structures such as a connecting plate or a rope located between the first connecting rod and the third connecting rod, and a connecting plate or a rope located between the second connecting rod and the fourth connecting rod.

Figure 6:
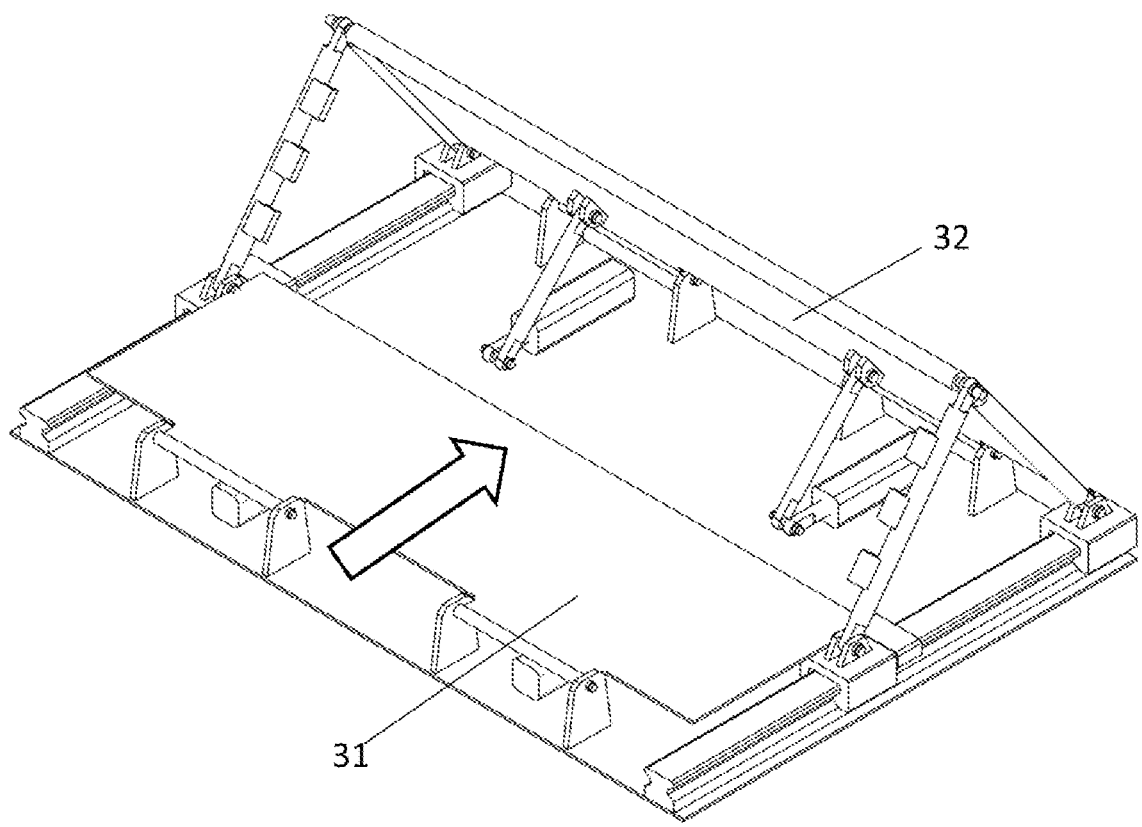
FIG. 6 is a first schematic diagram of a second windage resistance plate in a working state.
Figure 7:
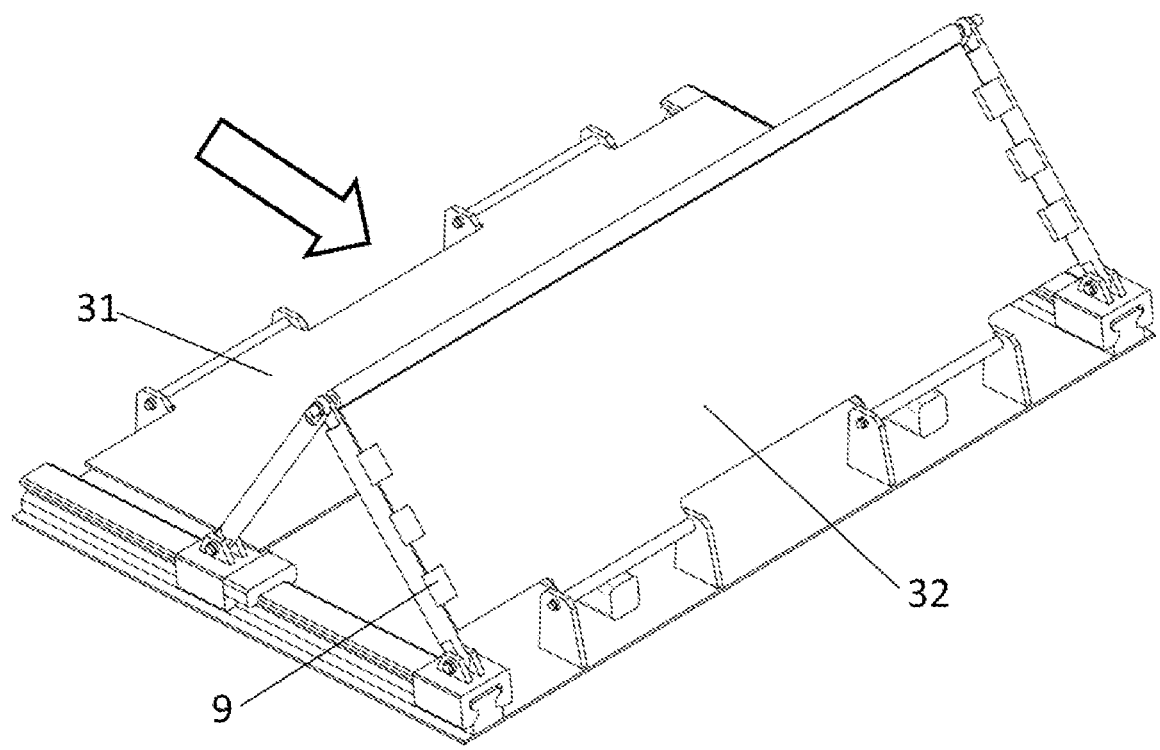
FIG. 7 is a second schematic diagram of the second windage resistance plate in the working state.

Still taking the ascending and opening second windage resistance plate 32 as an example, in combination with FIG. 6 and FIG. 7, when the second windage resistance plate is subjected to the driving force from the second cylinder 22, the second supporting rod 52 will push the second windage resistance plate 32 to raise. As the tail 321 of the second windage resistance plate is hinged with the second hinge seat 42, the second windage resistance plate 32 performs rotating motion with the second hinge seat 42 as the rotating center. As the stop dogs 9 are located above the second windage resistance plate 32 and a protruding part of each stop dogs blocks the rotating path of the second windage resistance plate 32, the second windage resistance plate 32 will push up the second connecting rod 72 and the fourth connecting rod 74 having the stop dogs 9. As the second connecting rod 72 and the first connecting rod 71 are jointly hinged to the first end 751 of the transverse rod, and the fourth connecting rod 74 and the third connecting rod 73 are jointly hinged to the second end 752 of the transverse rod, the second connecting rod 72 will drive the first connecting rod 71 to approach the middle portion of the first slide rail 61 and the fourth connecting rod 74 will drive the third connecting rod 73 to approach the middle portion of the second slide rail 62; and meanwhile, the first connecting rod 71 will drive the first slider 611 to slide and the third connecting rod 73 will drive the third slider 621 to slide. In addition, the limiting blocks 81, 82 located on the slide rails 61, 62 will limit excessive sliding of the first slider 611 and the third slider 621. As the first windage resistance plate 31 is not subjected to the driving force of the first cylinder 21, the first windage resistance plate 31 will not change and remains in a horizontal closed state.

As shown in FIG. 4, the transverse rod 75 is located between the first windage resistance plate 31 and the second windage resistance plate 32. The first end 751 of the transverse rod forms an integrated hinge with the first connecting rod 71 and the second connecting rod 72; and the second end 752 of the transverse rod forms an integrated hinge with the third connecting rod 73 and the fourth connecting rod 74; the first connecting rod 71, the second connecting rod 72, the third connecting rod 73, the fourth connecting rod 74 and the transverse rod 75 form a protecting frame to protect the first windage resistance plate 31 and the second windage resistance plate 32, so that the first windage resistance plate 31 and the second windage resistance plate 32 are always limited below the stop dogs 9; furthermore, as the middle portions of the first slide rail 61 and the second slide rail 62 are provided with the limiting blocks 81, 82, when the first slider 611 is pulled by the first connecting rod 71, the first slider 611 will stop sliding when sliding to the first limiting block 81 of the first slide rail 61, and when the third slider 621 is pulled by the third connecting rod 73, the third slider 621 will stop sliding when sliding to the second limiting block 82 of the second slide rail 62; or when the first windage resistance plate 31 is opening, as shown in FIG. 1, when the second slider 612 is pulled by the second connecting rod 72, it will stop sliding when sliding to the first limiting block 81 of the first slide rail 61, and when the fourth slider 622 is pulled by the fourth connecting rod 74, it will stop sliding when sliding to the second limiting block 82 of the second slide rail 62; thus the first windage resistance plate 31 and the second windage resistance plate 32, and the first cylinder 21 and the second cylinder 22 providing driving force, are protected effectively.

Another objective of the present application is to provide a rail train, the roof of which is provided with the bidirectional windage resistance brake apparatus.

The first air cylinder 21 and the second air cylinder 22 of the bidirectional windage resistance brake apparatus of the rail train are electrically connected with the electric system of the rail train to control the telescoping of the first air cylinder and the second air cylinder.

Figure 2:
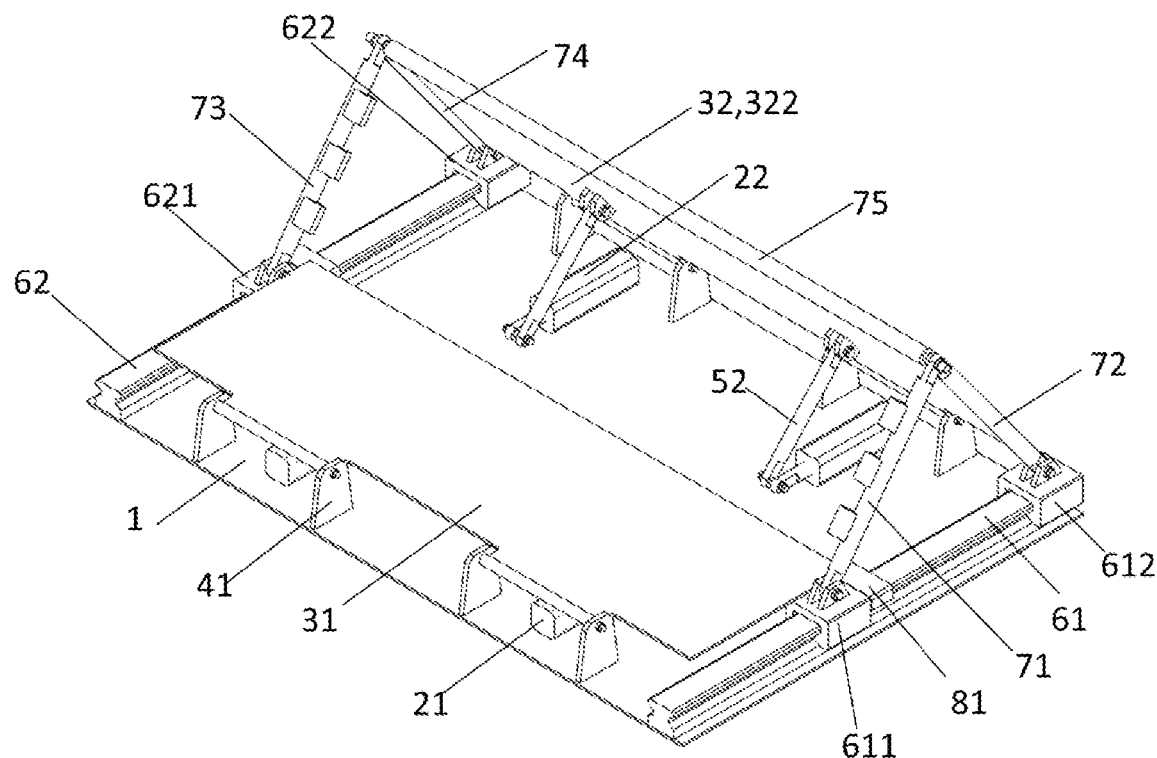
FIG. 2 is an open state diagram of a second windage resistance plate according to an embodiment.

In order to illustrate the embodiment clearer, referring to FIG. 6 and FIG. 7, the arrow in the drawings is a wind direction, and the working principle of the bidirectional windage resistance brake apparatus of the rail train in the embodiment is specifically described as below:

When the train travels, the wind is blown from the first windage resistance plate 31, and the train driver controls the second cylinder 22 to start by controlling the electric system of the rail train. The second cylinder 22 provides power to retract the telescopic rod. As the telescopic rod retracts, the second supporting rod 52 hinged therewith pushes the second windage resistance plate 32 upwards. As the tail 321 of the second windage resistance plate 32 is hinged with the second hinge seat 42 on the base 1, the second windage resistance plate 32 performs rotating motion with the second hinge seat 42 as the rotating center. When the second windage resistance plate 32 rotates, the stop dogs 9 of the second connecting rod 72 and the stop dogs 9 of the fourth connecting rod 74 blocked above the second windage resistance plate 32 will be pushed up by the second windage resistance plate 32. As the second slider 612 hinged with the second connecting rod 72 and the fourth slider 622 hinged with the fourth connecting rod 74 are not subjected to thrusts sliding left and right, the sliders do not slide; and at that time, the transverse rod 75 is pulled up by the second connecting rod 72 and the fourth connecting rod 74. The first connecting rod 71 and the third connecting rod 73 are further hinged with the transverse rod 75, the first connecting rod 71 and the third connecting rod 73 are pulled to the limiting blocks 81, 82 in the middle portions of the slide rails 61, 62. As the stop dogs 9 of the first connecting rod 71 and the third connecting rod 73 are arranged above the first windage resistance plate 31 and will not drive the first windage resistance plate 31 to perform the rotating motion, and at then, the second windage resistance plate 32 of the windage resistance brake apparatus is started completely, as shown in FIG. 2. Start of the first windage resistance plate 31 is similar to that of the second windage resistance plate 32 (as shown in FIG. 1) with different wind direction, which will not be repeated here.

When the train stops braking, the train driver controls the train electric system to close the windage resistance brake apparatus, the train electric system controls the second cylinder 22 to stretch the telescopic rod out, and at that time, the second windage resistance plate 32 loses the rotating thrust and is not subjected to wind resistance, so that the second windage resistance plate will descend under the weight of the transverse rod 75 and under the action of the telescopic rod of the second cylinder 22. The transverse rod 75 will take the first connecting rod 71 and the third connecting rod 73 hinged therewith to return to the horizontal position, and meanwhile, the first slider 611 and the third slider 621 return to its initial position, and the second connecting rod 72 and the fourth connecting rod 74 return to the horizontal position. So far, the second windage resistance plate 32 returns to the horizontal position, and the bidirectional windage resistance brake apparatus is closed completely, as shown in FIG. 3 and FIG. 4.

Compared with the prior art, the foregoing embodiment has at least the following advantages:

1. This present application improves the using efficiency of the windage resistance plates by starting the first windage resistance plate or the second windage resistance plate according to different traveling directions of the train, solving the problem that the two windage resistance plates are started together or closed together in conventional bidirectional windage resistance plates, avoiding that the two windage resistance plates start together and one of them provides a low windage resistance braking force, and realizing that the bidirectional windage resistance brake apparatus starts the corresponding windage resistance plate according to the traveling direction of the train, and improving the brake efficiency of the whole apparatus.

The present application provides parts such as the slide rails, the sliders and the connecting rods and the stop dogs, and the stop dogs can press the windage resistance plates. When the first windage resistance plate or the second windage resistance plate is driven by the cylinder, the windage resistance plate will push up the stop dogs pressed thereon, driving the connecting rods to move, and the connecting rods drives the hinged sliders to slide on the slide rails. Limiting blocks are provided in the middle of the slide rails, and the limiting blocks and the stop dogs work together, which ensure that the windage resistance plate will not be broken by the wind while providing braking force.

In the present application, when windage resistance braking is stopped, the cylinders release pressure, the windage resistance plate return to the horizontal position under gravity to be fit with the upper side of the train body, and the sliders under the action of the connecting rods return to the initial position, so that the whole apparatus is closed automatically, solving a tedious close flow of a conventional windage resistance brake apparatus.

The above embodiments are merely described for the preferred embodiments of the present application, and are not intended to limit the scope of the present application. Various modifications and improvements may be made by those skilled in the art to the technical solutions of the present application without departing from the spirit of the present application are intended to fall within the scope of protection defined by the claims of the present application.

The invention claimed is:

1. A bidirectional windage resistance brake apparatus, including a base, a first cylinder, a second cylinder, a first windage resistance plate and a second windage resistance plate, wherein,
   a tail of the first windage resistance plate is hinged with the base; the first windage resistance plate includes a first supporting rod, a first end of the first supporting rod is hinged to a middle portion of the first windage resistance plate, and a second end of the first supporting rod is connected with the first cylinder;
   a tail of the second windage resistance plate is hinged with the base; the second windage resistance plate includes a second supporting rod, a first end of the second supporting rod is hinged to a middle portion of the second windage resistance plate, and a second end of the second supporting rod is connected with the second cylinder; and
   the first windage resistance plate and the second windage resistance plate can be arranged in mirror symmetry; wherein,
   the base is provided with a first slide rail and a second slide rail, the first slide rail and the second slide rail are arranged substantially in mirror symmetry, the first slide rail is parallel to a running direction of a train, and the second slide rail is parallel to the first slide rail;
   the first slide rail is provided with a first slider and a second slider; wherein, the first slider is slidably connected with the first slide rail, the first slider is hinged with a first end of a first connecting rod, and a second end of the first connecting rod is hinged with a first end of a transverse rod; and the second slider is slidably connected with the first slide rail, the second slider is hinged with a first end of a second connecting rod, and a second end of the second connecting rod is hinged with the first end of the transverse rod;
   the second slide rail is provided with a third slider and a fourth slider; wherein, the third slider is slidably connected with the second slide rail, the third slider is hinged with a first end of a third connecting rod, and a second end of the third connecting rod is hinged with a second end of the transverse rod; and the fourth slider is slidably connected with the second slide rail, the fourth slider is hinged with a first end of a fourth connecting rod, and a second end of the fourth connecting rod is hinged with the second end of the transverse rod; and the first connecting rod, the second connecting rod, the third connecting rod and the fourth connecting rod are each provided with at least one stop dog, and each of the stop dogs is a protruding block; protruding directions of the stop dogs of the first connecting rod and the second connecting rod face the second slide rail, and protruding directions of the stop dogs of the third connecting rod and the fourth connecting rod face the first slide rail.

2. The bidirectional windage resistance brake apparatus according to claim 1, wherein, the stop dogs of the first connecting rod and the third connecting rod are located above the first windage resistance plate; the stop dogs of the second connecting rod and the fourth connecting rod are located above the second windage resistance plate; the first windage resistance plate is movably contacted with the stop dogs of the first connecting rod and the third connecting rod; and the second windage resistance plate is movably contacted with the stop dogs of the second connecting rod and the fourth connecting rod.

3. The bidirectional windage resistance brake apparatus according to claim 1, wherein, a middle portion of the first slide rail is provided with a first limiting block, and a middle portion of the second slide rail is provided with a second limiting block.

4. The bidirectional windage resistance brake apparatus according to claim 2, wherein, a middle portion of the first slide rail is provided with a first limiting block, and a middle portion of the second slide rail is provided with a second limiting block.

5. The bidirectional windage resistance brake apparatus according to claim 1, wherein, the transverse rod is located between the first windage resistance plate and the second windage resistance plate; the first end of the transverse rod forms an integrated hinge with the first connecting rod and the second connecting rod; and the second end of the transverse rod forms an integrated hinge with the third connecting rod and the fourth connecting rod.

6. The bidirectional windage resistance brake apparatus according to claim 2, wherein, the transverse rod is located between the first windage resistance plate and the second windage resistance plate; the first end of the transverse rod forms an integrated hinge with the first connecting rod and the second connecting rod; and the second end of the transverse rod forms an integrated hinge with the third connecting rod and the fourth connecting rod.

7. The bidirectional windage resistance brake apparatus according to claim 3, wherein, the transverse rod is located between the first windage resistance plate and the second windage resistance plate; the first end of the transverse rod forms an integrated hinge with the first connecting rod and the second connecting rod; and the second end of the transverse rod forms an integrated hinge with the third connecting rod and the fourth connecting rod.

8. The bidirectional windage resistance brake apparatus according to claim 4, wherein, the transverse rod is located between the first windage resistance plate and the second windage resistance plate; the first end of the transverse rod forms an integrated hinge with the first connecting rod and the second connecting rod; and the second end of the transverse rod forms an integrated hinge with the third connecting rod and the fourth connecting rod.

9. A bidirectional windage resistance brake apparatus, including a base, a first cylinder and a second cylinder mounted on the base, and a first windage resistance plate and a second windage resistance plate hinged to the base, wherein,
the first windage resistance plate includes a first supporting rod, a first end of the first supporting rod is hinged to the first windage resistance plate, and a second end of the first supporting rod is connected with the first cylinder, to promote an open of the first windage resistance plate;
the second windage resistance plate includes a second supporting rod, a first end of the second supporting rod is hinged to the second windage resistance plate, and a second end of the second supporting rod is connected with the second cylinder, to promote an open of the second windage resistance plate;
the base is further provided with a first slide rail and a second slide rail, both substantially parallel to a running direction of a train, wherein,
the first slide rail is provided with a first slider and a second slider slidably connected with the first slide rail respectively; wherein, the first slider is hinged with a first end of a first connecting rod, and a second end of the first connecting rod is hinged to a first end of a transverse rod; and the second slider is hinged with a first end of a second connecting rod, and a second end of the second connecting rod is hinged to the first end of the transverse rod;
the second slide rail is provided with a third slider and a fourth slider slidably connected with the second slide rail respectively; wherein, the third slider is hinged with a first end of a third connecting rod, and a second end of the third connecting rod is hinged to a second end of the transverse rod; and the fourth slider is hinged with a first end of a fourth connecting rod, and a second end of the fourth connecting rod is hinged to the second end of the transverse rod;
the first connecting rod, the second connecting rod, the third connecting rod and the fourth connecting rod are each provided with at least one stop dog; wherein, the stop dogs of the first connecting rod and the third connecting rod are located above the first windage resistance plate, and the stop dogs of the second connecting rod and the fourth connecting rod are located above the second windage resistance plate.

10. The bidirectional windage resistance brake apparatus according to claim 9, wherein, a middle portion of the first slide rail is provided with a first limiting block, and the first slider and the second slider are respectively located at two sides of the first limiting block; and a middle portion of the second slide rail is provided with a second limiting block, and the third slider and the fourth slider are respectively located at two sides of the second limiting block.

11. A rail train, wherein, a roof of the rail train is provided with the bidirectional windage resistance brake apparatus according to claim 9.

12. The rail train according to claim 11, wherein, the first cylinder and the second cylinder of the bidirectional windage resistance brake apparatus are electrically connected with an electric system of the rail train.

* * * * *